US012327202B2

(12) United States Patent
Liu et al.

(10) Patent No.: US 12,327,202 B2
(45) Date of Patent: Jun. 10, 2025

(54) ENTITY TAG ASSOCIATION PREDICTION METHOD, DEVICE, AND COMPUTER READABLE STORAGE MEDIUM

(71) Applicant: CHINA UNIONPAY CO., LTD., Shanghai (CN)

(72) Inventors: Lizhi Liu, Shanghai (CN); Yu Wang, Shenzhen (CN); Haijian Jiang, Shanghai (CN); Qing Min, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 18/713,631

(22) PCT Filed: Sep. 7, 2022

(86) PCT No.: PCT/CN2022/117421
§ 371 (c)(1),
(2) Date: May 24, 2024

(87) PCT Pub. No.: WO2023/093205
PCT Pub. Date: Jun. 1, 2023

(65) Prior Publication Data
US 2024/0419942 A1  Dec. 19, 2024

(30) Foreign Application Priority Data

Nov. 26, 2021 (CN) .......................... 202111424257.6

(51) Int. Cl.
*G06N 7/01* (2023.01)
*G06F 17/16* (2006.01)
*G06N 3/045* (2023.01)

(52) U.S. Cl.
CPC ............... *G06N 7/01* (2023.01); *G06F 17/16* (2013.01); *G06N 3/045* (2023.01)

(58) Field of Classification Search
CPC ........... G06N 3/045; G06N 7/01; G06F 17/16
See application file for complete search history.

(56) References Cited

U.S. PATENT DOCUMENTS

| 11,126,689 B1 | 9/2021 | Warmsley et al. |
| 2015/0220530 A1 | 8/2015 | Banadaki et al. |

FOREIGN PATENT DOCUMENTS

| CN | 106326345 A | 1/2017 |
| CN | 111881840 A | 11/2020 |

(Continued)

OTHER PUBLICATIONS

Mao, K., et al, Item Tagging for Information Retrieval: A Tripartite Graph Neural Network based Approach, Retrieved from Internet:<https://dl.acm.org/doi/abs/10.1145/3397271.3401438> (Year: 2020).*

(Continued)

*Primary Examiner* — Paul M Knight
*Assistant Examiner* — Bart I Rylander
(74) *Attorney, Agent, or Firm* — MARSHALL, GERSTEIN & BORUN LLP

(57) ABSTRACT

The present disclosure provides an entity tag association prediction method, device, system, and a computer readable storage medium. The method includes: determining an entity relationship network, a tag relationship network and an entity tag association network; constructing an entity similarity graph according to the entity relationship network, constructing a tag similarity graph according to the tag relationship network and the entity tag association network, and constructing an entity tag association bipartite graph according to the entity tag association network; extracting an entity feature, and constructing a tag feature according to the tag similarity graph; integrating the entity similarity graph, the tag similarity graph, and the entity tag association bipartite graph into a graph convolutional network to con- (Continued)

struct a prediction model; inputting the entity feature and the tag feature into the prediction model for training until the model converges, and outputting a prediction result of the prediction model.

19 Claims, 6 Drawing Sheets

(56) References Cited

FOREIGN PATENT DOCUMENTS

| | | |
|---|---|---|
| CN | 112232889 A | 1/2021 |
| CN | 112487199 A | 3/2021 |
| CN | 112559640 A | 3/2021 |
| CN | 112766500 A | 5/2021 |
| CN | 113010687 A | 6/2021 |
| CN | 113362157 A | 9/2021 |
| CN | 114091614 A | 2/2022 |
| EP | 3640864 A1 | 4/2020 |

OTHER PUBLICATIONS

Baranchuk, D., Towards Similarity Graphs Constructed by Deep Reinforcement Learning, Retrieved from Internet:< https://arxiv.org/abs/1911.12122> (Year: 2020).*

Chen, B., et al, TGCN: Tag Graph Convolutional Network for Tag-Aware Recommendation, Retrieved from Internet:<https://dl.acm.org/doi/abs/10.1145/3340531.3411927> (Year: 2020).*

Krivosheev, E., et al., Siamese Graph Neural Networks for Data Integration, Retrieved from Internet:< https://arxiv.org/abs/2001.06543> (Year: 2020).*

Yu, D., et al, Knowledge Embedding Based Graph Convolutional Network, Retrieved from Internet:<https://dl.acm.org/doi/abs/10.1145/3442381.3449925> (Year: 2021).*

Yang, Z., et al, RTJTN: Relational Triplet Joint Tagging Network for Joint Entity and Relation Extraction, Retrieved from Internet:<https://onlinelibrary.wiley.com/doi/full/10.1155/2021/3447473> (Year: 2021).*

Li, et al. "Dual graph embedding for object-tag link prediction on the knowledge graph." In *2020 IEEE International Conference on Knowledge Graph (ICKG)*, pp. 283-290. IEEE, 2020.

Zhang, et al. "Random walk-based top-k tag generation in bipartite networks of entity-term type." In *2019 IEEE 31st International Conference on Tools with Artificial Intelligence (ICTAI)*, pp. 125-132. IEEE, 2019.

Jun, et al. "Recommendation algorithm based on modularity and label propagation." *Journal of Computer Applications* 40, No. 9 (2020): 2606.

Zheng, et al. "Research on knowledge recommendation based on weighted directional tripartite graphic network structure." In *Proceedings of the 12th Chinese Conference on Computer Supported Cooperative Work and Social Computing*, pp. 201-204. 2017.

Research on Feature Extraction of Defaulted Executors Based on Multiple Heterogeneous Data Fusion (2020).

Chinese Application No. CN202111424257.6, First Office Action, mailed Sep. 2, 2024.

International Application No. PCT/CN2022/117421, International Search Report and Written Opinion, mailed Nov. 30, 2022.

\* cited by examiner

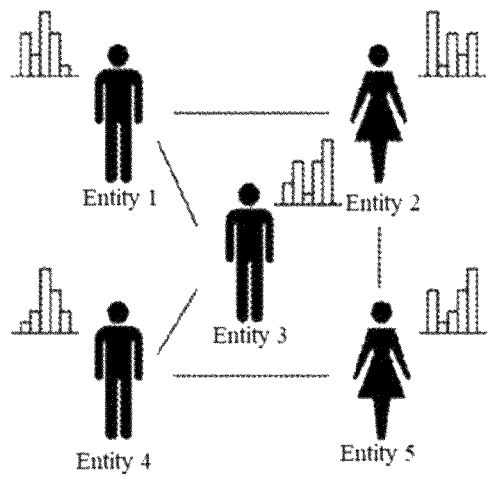
FIG. 2
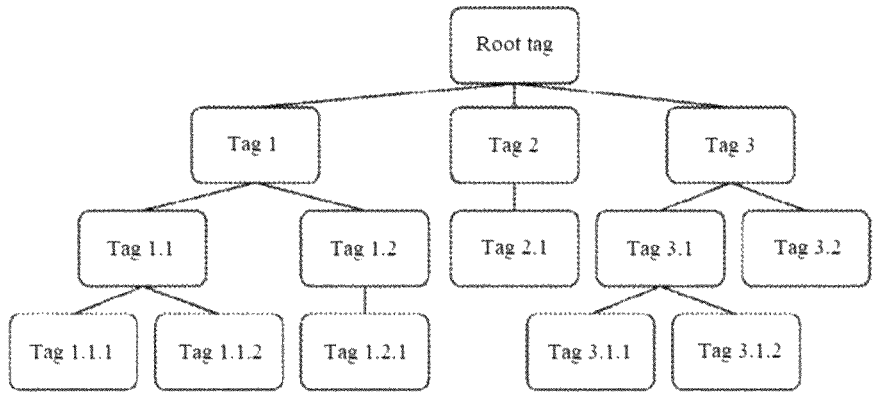
FIG. 3
FIG. 4

ENTITY TAG ASSOCIATION PREDICTION METHOD, DEVICE, AND COMPUTER READABLE STORAGE MEDIUM

CROSS-REFERENCE TO RELATED APPLICATIONS

The present application is a U.S. national stage of International Application No. PCT/CN2022/117421, filed Sep. 7, 2022, which claims priority to Chinese Patent Application No. 202111424257.6, titled "ENTITY TAG ASSOCIATION PREDICTION METHOD, DEVICE, AND COMPUTER READABLE STORAGE MEDIUM", filed on Nov. 26, 2021, the disclosures of which are hereby incorporated herein by reference for all purposes.

FIELD

The present disclosure relates to an entity tag association prediction method, device, and a computer readable storage medium.

BACKGROUND

This section intends to provide a background or context for the embodiments of the present disclosure as stated in the claims. The description herein is not recognized as conventional by virtue of its inclusion in this section.

With the advent of the big data era, massive amounts of data emerge, such as users, articles, commodities and other objects with increasingly rich semantic content, and the tag information portraying their characteristics is also becoming more and more complex. The tag library employed by an e-commerce platform to describe user characteristics often contains tens of thousands of entries, with one user on average being annotated with thousands of tags. In order to satisfy the fine-grained description of sample objects nowadays, multi-tag learning problem has gradually become one of the research hotspots in academia and industry, and finds wide-ranging applications in fields such as image recognition, text classification, information retrieval, and personalized recommendation.

However, due to the immense scale of the tag library and the number of samples in tens of thousands, existing annotations for the samples are often highly incomplete, with numerous omissions. For example, the category annotations for the film "Enemy at the Gates" on a movie review platform may only include "history" and "war", but omit tags such as "love" and "action", leading to an inaccurate description of the movie.

Incomplete annotations are very common in multi-tag classification problems, and may affect real-life application scenarios such as accurate recommendation. Therefore, how to improve the completeness of sample data annotation is an urgent problem to be solved.

SUMMARY

The present disclosure provides the following solutions.

In a first aspect, there is provided an entity tag association prediction method, comprising: determining an entity relationship network, a tag relationship network and an entity tag association network, the entity tag association network comprising an unknown entity tag association relationship; constructing an entity similarity graph according to the entity relationship network, constructing a tag similarity graph according to the tag relationship network and the entity tag association network, and constructing an entity tag association bipartite graph according to the entity tag association network; extracting an entity feature, and constructing a tag feature according to the tag similarity graph; integrating the entity similarity graph, the tag similarity graph, and the entity tag association bipartite graph into a graph convolutional network to construct a prediction model; inputting the entity feature and the tag feature into the prediction model for training until the model converges, and outputting a prediction result of the prediction model, the prediction result comprising the association relationship between each entity and each tag.

In a second aspect, there is provided an entity tag association prediction device, comprising: at least one processor; and a memory communicatively connected to the at least one processor; wherein the memory stores instructions executable by the at least one processor, the instructions being executed by the at least one processor to enable the at least one processor to perform: the method according to the first aspect.

In a third aspect, there is provided a computer readable storage medium, with a program stored thereon, wherein the program, when executed by a multicore processor, causes the multicore processor to perform the method according to the first aspect.

At least one of the aforementioned technical solutions employed in the embodiments of the present disclosure can achieve the following beneficial effects: in this embodiment, by using the graph convolutional network to learn the entity relationship network, the tag relationship network and the existing entity tag association network, as well as the constructed entity feature and tag feature, it is possible to effectively predict the degree of association between each sample and each tag, and further realize the tag filling for partially annotated samples, thereby enhancing the completeness of entity tag annotations.

It is to be understood that the foregoing description is only an overview of the technical solution of the present disclosure, so that the technical means of the present disclosure can be more clearly understood and thus can be implemented in accordance with the contents of the specification. To make the above and other objectives, features and advantages of the present disclosure more apparent and easier to understand, specific embodiments of the present disclosure are hereinafter illustrated by way of example.

BRIEF DESCRIPTION OF THE DRAWINGS

By reading the detailed description of the exemplary embodiments below, a person skilled in the art will understand the advantages and benefits of the present disclosure as well as other advantages and benefits. The drawings are for the purpose of illustrating exemplary embodiments only, and are not to be considered as a limitation to the present disclosure. Moreover, the same reference numerals refer to the same components throughout the drawings. In the drawings:

FIG. 2 is a schematic structural diagram of an entity relationship network according to one embodiment of the present disclosure;

FIG. 3 is a schematic structural diagram of a tag relationship network according to one embodiment of the present disclosure;

FIG. 4 is a schematic structural diagram of an entity tag association network according to one embodiment of the present disclosure;

In the drawings, the same or corresponding reference numerals refer to the same or corresponding parts.

DETAILED DESCRIPTION

The exemplary embodiments of the present disclosure will be described hereinafter in more detail with reference to the drawings. Although the drawings illustrate the exemplary embodiments of the present disclosure, it is to be understood that the present disclosure may be implemented in various forms and should not be restricted by the embodiments set forth herein. Rather, these embodiments are provided to enable a more thorough understanding of the present disclosure and to enable the complete communication of the scope of the present disclosure to a person skilled in the art.

In the description of the embodiments of the present disclosure, it is to be understood that terms such as "including" or "having" are intended to indicate the presence of the features, numbers, steps, acts, components, parts or combinations thereof disclosed herein and are not intended to exclude the possibility of the presence of one or more other features, numbers, steps, acts, components, parts or combinations thereof.

Unless otherwise specified, "/" means "or". For example, A/B may mean either A or B. "And/or" in the present disclosure merely describes the association relationship of associated objects, indicating that there may be three kinds of relationships. For example, A and/or B may represent the following three circumstances: A alone, both A and B, and B alone.

The terms such as "first", "second" are for descriptive purpose only, and not to be construed as indicating or suggesting relative importance or implicitly specifying the number of the technical features indicated. Therefore, the features defined with "first", "second" and the like may expressly or impliedly include one or more such features. In the description of the embodiments of the present disclosure, unless otherwise specified, "a plurality of" means two or more.

In addition, it should be noted that the embodiments and the features in the embodiments of the present disclosure may be combined with each other, as long as they are not in conflict. The present disclosure will be described in detail hereinafter with reference to the drawings and in conjunction with embodiments.

Figure 1:
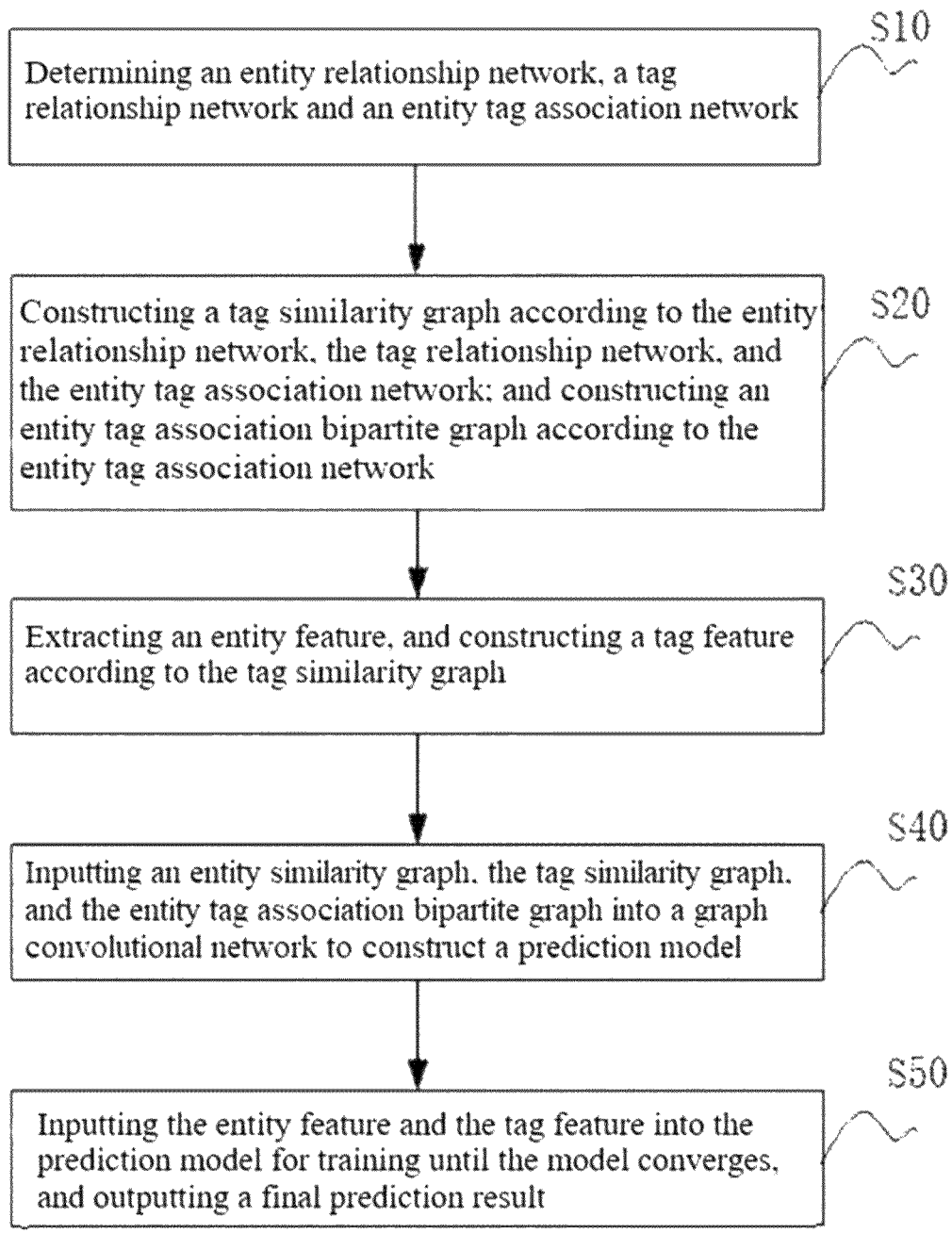
FIG. 1 is a schematic flow diagram of an entity tag association prediction method according to one embodiment of the present disclosure.

FIG. 1 is a schematic flow diagram of an entity tag association prediction method according to one embodiment of the present disclosure, for predicting the association relationship between all entities and tags. In this flow diagram, from the perspective of a device, the executing entity may be one or more electronic devices; from the perspective of a program, the executing entity may correspondingly be programs loaded onto these electronic devices.

As illustrated in FIG. 1, the method provided in this embodiment may comprise the following steps:

S10: determining an entity relationship network, a tag relationship network and an entity tag association network;

Specifically, the entity relationship network is a network with entities as nodes and association relationships between entities as edges, for indicating the association relationships between entities. The entity relationship network is an undirected weighted network. For example, in a transaction system, users may serve as entities. Then, the association relationships between entities may be established based on factors such as historical transactions between users, user locations, and user attributes.

Specifically, the above tag relationship network is a network with tags as nodes and the association relationships between tags as edges, for indicating the association relationships between tags. For example, the tag "furniture" and the tag "bed" are in a parent-child relationship, and the tag "bed" and the tags "double bed", "single bed" are in a parent-child relationship. As such, a tree-structured tag relationship network may be formed.

Specifically, the entity tag association network includes at least some of the association relationships between entities and tags. It can be understood that due to the immense scale of the tag library and the number of samples in tens of thousands, existing annotations for the samples are often highly incomplete, with numerous omissions. Therefore, in the existing entity tag association network of S10, there are only some entity-tag association relationships, and a large number of unknown entity-tag association relationships need to be obtained in the subsequent prediction model.

The above entity relationship network and tag relationship network are homogeneous node relationship networks, and an entity tag association graph is a heterogeneous node relationship network.

S20: constructing an entity similarity graph according to the entity relationship network, constructing a tag similarity graph according to the tag relationship network and the entity tag association network, and constructing an entity tag association bipartite graph according to the entity tag association network;

Wherein, the entity relationship network is an undirected weighted network. The entity similarity graph is a homogeneous similarity graph constructed based on the entity relationship network. For example, the entity similarity graph may be directly determined according to an adjacency matrix of the entity relationship network, for recording the degree of closeness of relationship between each pair of entities.

Likewise, the degree of closeness of relationship between each pair of tags may be determined according to the tag relationship network and the entity tag association network, and further used to construct the tag similarity graph. The degree of closeness of relationship between each entity and each tag may be determined according to the entity tag association network, and further used to construct the entity tag association bipartite graph. It is known that a bipartite graph, also known as a biograph, is a special model in graph theory.

S30: extracting an entity feature, and constructing a tag feature according to the tag similarity graph;

The above entity feature originates from inherent characteristic information of the entity. For example, considering a user as an entity, the entity feature may include the user's basic information, spending capacity, behavioral traits, psychological attributes, etc. The above tag feature is constructed by derivation from the tag similarity graph.

S40: inputting the entity similarity graph, the tag similarity graph, and the entity tag association bipartite graph into a graph convolutional network to construct a prediction model;

The present disclosure constructs three networks within two categories, respectively: homogeneous node relationship networks (i.e. an entity relationship network and a tag relationship network) and a heterogeneous node relationship network (i.e. an entity tag association network). The prediction model constructed in this disclosure may incorporate the entity similarity graph, the tag similarity graph and the entity tag association bipartite graph corresponding to the above three networks. Consequently, the model can learn low-order and high-order topological structures in each network during model training, and explore the complex nonlinear relationships among objects.

Furthermore, various graph convolutional network modules may be designed for the prediction model constructed in the present disclosure according to different types of input networks. Examples of these modules include a Bi-GCN (Bipartite Graph Convolutional Network) module running on the entity tag association bipartite graph and S-GCN modules running on the similarity graphs. Among them, the Bi-GCN module performs message propagation on the unweighted associated edges between entities and tags to realize full communication and fusion of the information contained in the two objects; the S-GCN (Similarity Graph Convolutional Network) modules perform message propagation on the weighted edges of the similarity graphs, and aggregate the information contained in the adjacent nodes according to the degree of similarity. By stacking multilayer graph convolutional network layers for repetitive iterations, it is possible to repeatedly capture the low-order and high-order topological structures in the network, and explore the complex nonlinear relationships among objects.

S50: inputting the entity feature and the tag feature into the prediction model for training until the model converges, and outputting a final prediction result.

The entity feature and the tag feature are input as initial features into the prediction model, and after multiple rounds of learning of various networks by the graph convolutional network, the final prediction result is output, which includes the association relationship between each entity and each tag.

It can be understood that the present disclosure aims to predict missing tags for entities that have been partially annotated. For example, referring to FIG. 2, it illustrates an example of an entity relationship network, comprising multiple entities and association relationships between them, where a feature vector, i.e. an entity feature, corresponding to each entity may be determined through existing feature mining techniques. Referring to FIG. 3, it illustrates an example of a tag relationship network, where multiple tags are organized in a tree-like structure to form a hierarchical structure, i.e. a hierarchical tag relationship network. The topmost tag is a "root tag" which has no actual meaning, and each of the intermediate tags below it has several child-tags, with the child-tags and the parent-tags in a parent-child inheritance relationship (i.e. "is-a" relationship). Referring to FIG. 4, it illustrates an example of an entity tag association network which may also be regarded as an entity tag association matrix. In this figure, there are known association relationships between some entities in the entity relationship network shown in FIG. 2 and some tags in the tag relationship network shown in FIG. 3, i.e. the elements that display "1" in the association matrix. However, there are still a large number of unknown entity-tag association relationships at the same time, i.e. the elements that display "?" in the association matrix. It can be understood that these unknown entity-tag association relationships do not mean that there is certainly no association between the corresponding entities and tags. Rather, such association may not have been discovered yet. It follows that the objective of the present disclosure is to predict the missing tags of entities, in other words, to predict the degree of association between each entity and each tag.

It can be understood that, for example, considering a user as an entity, two users annotated with the same tag are very likely to have similar behavioral traits, and even more likely to have similar tags. For example, both users A and B belong to "high-frequency gas station consumers", and user A is also a "high-frequency parking lot consumer". Although user B is not annotated as a "high-frequency parking lot consumer" in the annotation set, it is very likely that user B also has this trait. Therefore, constructing a prediction model based on the entity tag association network can better explore potential similar tags of users. Based on the entity relationship network, it can be learnt that users are not independent nodes, but have certain social relationships that can commonly be modeled into a social network. For example, there is a strong association between users A and B. When user A is a "high-frequency parking lot consumer", it is very likely that user B also has this trait. Based on the tag relationship network and the entity tag association network, it can be learnt that tags are not independent nodes, but have certain association relationships. For example, the subjects annotated with tags C and D highly overlap; when user A has "tag C", it is very likely that user A also has "tag D", etc. The above entity relationship network, tag relationship network and entity tag association network imply a large number of tag-tag, entity-tag, entity-entity association relationships, which may be learnt through a graph convolutional network.

In order to achieve the above objectives, the present disclosure integrates an entity similarity graph, a tag similarity graph and an entity tag association bipartite graph constructed based on an entity relationship network, a hierarchical tag relationship network and an entity tag association network into a graph convolutional network, and further generates a prediction model to be trained. Then, initial feature vectors are established for entity nodes and tag nodes respectively, and sent to the prediction model to be trained for model training. During the model training, topological information in the aforementioned entity relationship network, hierarchical tag relationship network and entity tag association network is fully learnt using graph convolutional network technologies, to generate high-quality entity node embedding representations and tag node embedding representations. Finally, a vector dot product between the final embedding representation of each entity node and the final embedding representation of each tag node may be output as a likelihood prediction result of whether there is an association between each entity and each tag, i.e. the association relationship between each entity and each tag is obtained.

Further, the entity may be supplementarily annotated with tags based on the predicted entity-tag association relationship. For example, when the predicted association relationship between an entity and a tag is greater than a threshold, it is deemed that they are associated, and then may be annotated accordingly.

Therefore, for the actual situation of incomplete entity annotations, optimizations have been made in terms of information extraction and utilization of the entities and the tags per se and the association network between them. This enables tag completion for partially annotated samples, thereby enhancing the completeness of entity tag annotations.

In one embodiment, in order to obtain an entity relationship network more easily, S10 may further specifically comprise:
- determining an entity set $\mathcal{U}=\{u_1, u_2, \ldots, u_n\}$, wherein n is the total number of entities, and further determining an entity relationship network $G_u(\mathcal{U}, \varepsilon_u)$ with multiple entities in the entity set as nodes, wherein $\varepsilon_u \subseteq \mathcal{U} \times \mathcal{U}$ indicates the relationship between various entities in the entity set.

Wherein, the adjacency matrix of the entity relationship network is $A_\mathcal{U} \in [0,1]^{n \times n}$. Since the entity relationship network belongs to an undirected weighted network, the edge weight $(A_\mathcal{U})_{i,i'}=(A_\mathcal{U})_{i',i}$ between entity i and entity i' is determined to indicate the degree of closeness of relationship between two entities, wherein i=1, 2, . . . , n and i'=1, 2, . . . , n. The closer the edge weight is to 1, the closer the relationship between the two is; the closer the edge weight is to 0, the more distant the relationship between the two is; when the edge weight is equal to 0, this indicates that there is no direct relationship between the two.

In one embodiment, in order to obtain the tag relationship network, S10 may further specifically comprise:
- determining a tag set $\mathcal{H}=\{h_1, h_2, \ldots, h_m\}$, wherein m is the total number of tags, and further determining a tag relationship network $G_h(\mathcal{H}, \varepsilon_n)$ with multiple tags in the tag set as nodes, wherein $\varepsilon_h \subseteq \mathcal{H} \times \mathcal{H}$ indicates the relationship between various tags in the tag set.

Optionally, as illustrated in FIG. 3, the multiple tags in the above tag set follow a hierarchical structure. As such, the tag relationship network actually forms a rooted tree, i.e. the network is devoid of directed cycles, with only the root node having an in-degree of 0, while all other nodes having an in-degree of 1.

In one embodiment, in order to obtain the entity tag association network, S10 may further specifically comprise:
- determining the association $\mathcal{R}_{ij}$ between each entity $u_i$ and each tag $h_j$ according to existing annotation information, to obtain an entity tag association network $\mathcal{R} \subseteq \{0,1\}^{n \times m}$, wherein the association $\mathcal{R}_{ij}$ between each entity $u_i$ (i=1, 2, . . . , n) and each tag $h_j$ (j=1, 2, . . . , m) is 1 or 0. The association $\mathcal{R}_{ij}$ takes on a value of 1 or 0, where $\mathcal{R}_{ij}=1$ denotes a positive association (positive sample) between the entity $u_i$ and the tag $h_j$, and $\mathcal{R}_{ij}=0$ denotes an unknown association between the entity $u_i$ and the tag $h_j$.

In one embodiment, the tag set $\mathcal{H}=\{h_1, h_2, \ldots, h_m\}$ is a hierarchical tag set, with the tag relationship network forming a tree structure. For example, in FIG. 3, upper and lower tag nodes of the tree structure are in a parent-child inheritance relationship. It can be understood that the tags in the tag set are often not independent of each other, but have internal dependencies. In practical applications, the tag set may be commonly organized into a hierarchical structure, i.e. a hierarchical tag set, according to the semantic relationship between tags, thereby making the description of samples more refined.

In one embodiment, based on the above hierarchical tag set, the method further comprises: updating the existing annotation information according to the hierarchical relationship between the tags; wherein under the condition that a specified entity is annotated with a specified tag, the specified entity will be supplementarily annotated with all ancestral tags of the specified tag according to the hierarchical relationship between the tags.

Specifically, the known association between entities and tags is denoted as $\mathcal{R} \subseteq \{0,1\}^{n \times m}$, wherein $\mathcal{R}_{ij}=1$ denotes there may exist a positive association between the entity $u_i$ and the tag $h_j$, and $\mathcal{R}_{ij}=0$ does not mean there is no association between the entity $u_i$ and the tag $h_j$, but only indicates such association is unknown yet. Since the tags follow a hierarchical structure, and the association between entities and tags satisfies the "true-path-rule", under the condition that an entity is annotated with a tag, it will also be annotated with all ancestral tags of that tag. In other words, the annotation may propagate upward along the hierarchical structure of the tags.

In one embodiment, in order to construct the entity similarity graph, S20 may further specifically comprise:
- determining an entity similarity graph $S_u$ according to an adjacency matrix $A_u$ of the entity relationship network $G_u$. For example, the entity similarity graph $S_u=A_u$.

The above adjacency matrix $A_u \in [0,1]^{n \times m}$ forms an n-order square matrix, wherein the edge weight $(A_\mathcal{U})_{i,i'}=(A_\mathcal{U})_{i',i}$ between entity $u_i$ and entity $u_{i'}$ indicates the degree of closeness of relationship between two entities.

It can be understood that since the entity relationship network is an undirected weighted network, already possessing the characteristics of a similarity graph, it is possible to directly obtain the similarity graph based on the adjacency matrix $A_u$, without the need for additional construction.

In one embodiment, in order to construct the tag similarity graph, S20 may further specifically comprise the following steps a and b:

a. computing tag information quantity IC(h) of each tag based on the entity tag association network $\mathcal{R}$, wherein the tag information quantity is used to indicate the degree of concreteness of each tag; the higher the information quantity, the more specific characteristics the tag reflects. For example, the information quantity of the "Sports News" tag is lower than that of the "NBA News" tag, as the former is more general and the latter is more specific.

Optionally, the tag information quantity of each tag may be computed using the following formula:

$$IC(h) = -\log\frac{n_h}{n};$$

wherein n is the total number of entities, $n_h$ is the known number of entities annotated with tag h.

Of course, other formula or method may also be used to compute the tag information quantity of each tag, as long as it can indicate the degree of concreteness of the tag. The present disclosure does not impose specific limitations in this regard.

b. computing the similarity between tags using the tag information quantity of each tag and the tag relationship network, to obtain a tag similarity graph $S_h$; wherein the tag similarity graph S forms a m-order square matrix, i.e. $S_h \in [0,1]^{m \times m}$.

Optionally, the similarity between tags may be computed using the following formula:

$$S_h(h_j, h_{j'}) = \frac{2 \times IC(h_{MICA})}{IC(h_j) + IC(h_{j'})} \times \left(1 - \frac{1}{1 + IC(h_{MICA})}\right);$$

wherein $h_{MICA}$ is the most informative common ancestor of tag $h_j$ and tag $h_{j'}$, i.e. the common ancestral tag node of tag $h_j$ and tag $h_{j'}$ with the highest tag information quantity.

Of course, other formula or method may also be used to compute the tag similarity. For example, this may be computed by determining whether $h_j$ and $h_{j'}$ have a common ancestral tag, and determining the distance from these two tags to the common ancestral tag. It can be understood that any method or formula capable of indicating implicit degree of closeness between tags may be used. The present disclosure does not impose specific limitations in this regard.

By the above steps a and b, it is possible to explore the implicit similarity measurement between tags, and further construct a tag similarity graph capable of representing the similarity between tags, thus enhancing the predictive accuracy of the prediction model.

In one embodiment, constructing the entity tag association bipartite graph according to the entity tag association network comprises: constructing an entity tag association bipartite graph A according to an entity tag association matrix R;
wherein $$A = \begin{bmatrix} 0 & R \\ R^T & 0 \end{bmatrix},$$

0 is an all-zero matrix, i.e. an n+m-order square matrix composed of element 0 or 1.

In one embodiment, extracting the entity feature, and constructing the tag feature according to the tag similarity graph in S30 comprises: determining a multi-dimensional entity feature $x_i^{(u)}$ of each entity $u_i$ in the entity set through feature mining; performing symmetric normalization according to the tag similarity graph $S_h$ to obtain a normalized matrix $\overline{S_h}$; computing a positive pointwise mutual information matrix $X^{(h)}$ based on the normalized matrix $\overline{S_h}$; and constructing a tag feature according to the positive pointwise mutual information matrix $X^{(h)}$, wherein $x_j^{(h)}$ in the j-th row of the matrix $X^{(h)}$ serves as the tag feature $x_j^{(h)}$ of the j-th tag $h_j$.

The feature vectors of the entity nodes in the present disclosure originate from inherent characteristic information of the entities. Take e-commerce platform users as an example, their features may include the users' basic information, spending capacity, behavioral traits, psychological attributes, etc. The feature vector of the entity $u_j$ may be denoted as $x_i^{(u)}=(x_{i,1}^{(u)}, x_{i,2}^{(u)}, \ldots, x_{i,d^{(u)}}^{(u)})$, where $d^{(u)}$ is the dimension of the entity feature vector.

The feature vectors of the tag nodes in the present disclosure are derived from the tag similarity graph.

Firstly, the tag relationship matrix $S_h$ may be subjected to symmetric normalization to obtain a normalized matrix $\overline{S_h}$:

$$\overline{S_h} = D^{-\frac{1}{2}} S_h D^{-\frac{1}{2}};$$

wherein $D = \text{diag}(d_1, d_2, \ldots, d_m)$, $d_i = \Sigma_j(S_h)_{i,j}$

Then, a positive pointwise mutual information (PPMI) matrix $X^{(h)}$ is computed based on the $\overline{S_h}$:

$$X_{i,j}^{(h)} = \max\left(0, \log\left(\frac{\overline{S_h}_{i,j} \sum_s \sum_t \overline{S_h}_{s,t}}{\sum_s \overline{S_h}_{s,j} \sum_t \overline{S_h}_{i,t}}\right)\right),$$

wherein $x_i^{(h)}$ in the i-th row of the matrix $X^{(h)}$ serves as the feature vector of the i-th tag $h_i$.

In this way, it is possible to accomplish feature mining by constructing the tag similarity graph, and construct initial tag features for inputting into a prediction model.

Figure 5:
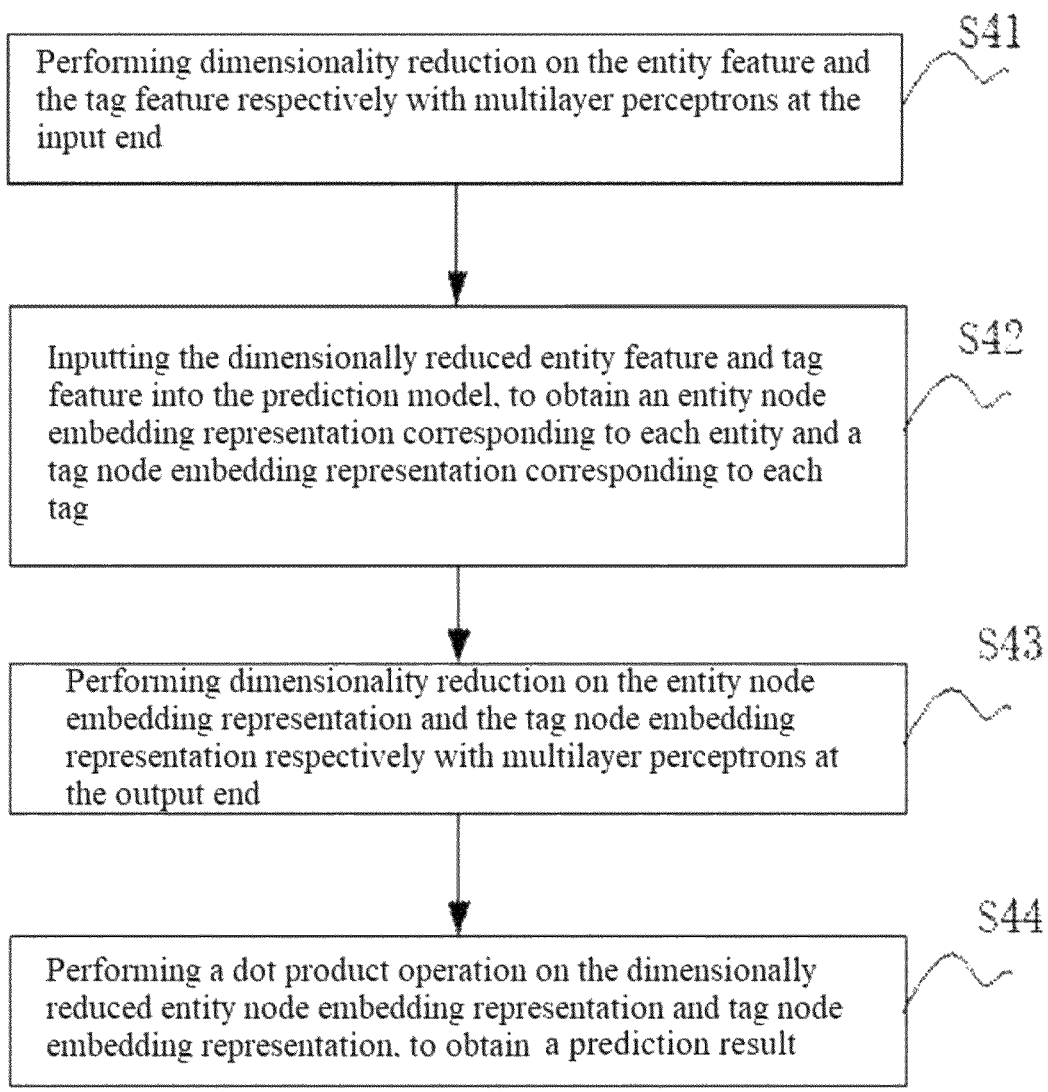
FIG. 5 is a schematic flow diagram of an entity tag association prediction method according to another embodiment of the present disclosure.

In one embodiment, referring to FIG. 5, inputting the entity feature and the tag feature into the prediction model for training in S40 comprises:

S41: performing dimensionality reduction on the entity feature and the tag feature respectively with multilayer perceptrons (MLP) at the input end;

S42: inputting the dimensionally reduced entity feature and tag feature into the prediction model, to obtain an entity node embedding representation corresponding to each entity and a tag node embedding representation corresponding to each tag; wherein the prediction model incorporates the entity similarity graph, the tag similarity graph and the entity tag association bipartite graph constructed in S20;

S43: performing dimensionality reduction on the entity node embedding representation and the tag node embedding representation respectively with multilayer perceptrons at the output end; and S44: performing a dot product operation on the dimensionally reduced entity node embedding representation and tag node embedding representation, to obtain the prediction result.

Figure 6:
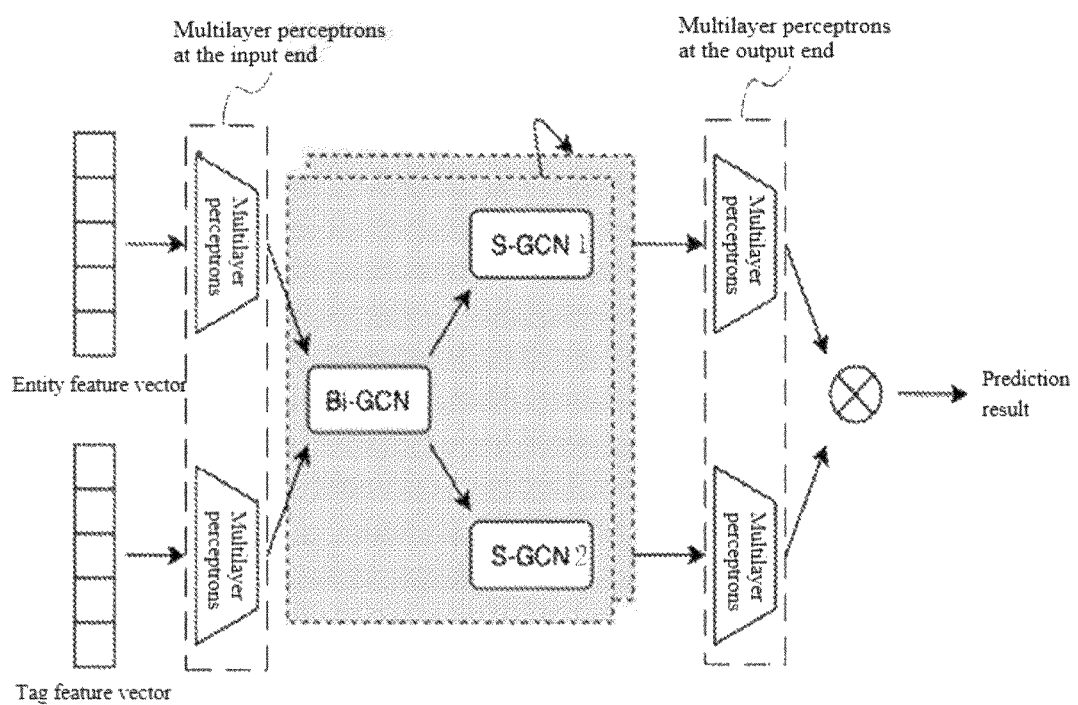
FIG. 6 is a schematic structural diagram of a prediction model according to one embodiment of the present disclosure.

Specifically, referring to FIG. 6, firstly, the constructed entity feature and tag feature are dimensionally reduced to the same dimension respectively through multilayer perceptrons at the input end. Wherein, the multilayer perceptron is a feedforward neural network that maps a set of input vectors to a set of output vectors. Then, the topology information on the entity similarity graph, the tag similarity graph and the tag association bipartite graph is integrated into the node representation through a graph neural network (GCN). For example, the Bi-GCN module may be first used for message propagation on the entity tag association bipartite graph, enabling interaction between the information of entities and the information of tags. Next, corresponding S-GCN modules are respectively run on the respective similarity graphs, to re-extract the previous implicit representation, for example, on the S-GCN1 module. The above step may be repeated several times, i.e. stacking several layers of GCN modules, so as to fully capture the low-order and high-order topological information in the graphs. Finally, the implicit representations obtained by GCN processing with the multilayer perceptrons at the output end are dimensionally reduced, and a dot product operation is performed, to obtain a final prediction result.

In one embodiment, in order to perform dimensionality reduction on the entity feature and the tag feature, and unify them into the same dimension, S41 specifically comprises:

receiving a high-dimensional entity feature $x_i^{(u)}$ and a high-dimensional tag feature $x_j^{(u)}$, i.e. the feature vectors explored or constructed in the above S103, performing dimensionality reduction by iterative processing through multiple hidden layers of multilayer perceptrons at the input end, and outputting the dimensionally reduced entity feature and tag feature.

The following is an introduction of the multilayer perceptrons at the input end corresponding to the entity node $u_i$ and the tag node $h_j$, respectively.

The conversion function for the entity node $u_i$ in the l-th hidden layer of the corresponding multilayer perceptrons at the input end is defined as:

$$h_{u_i}^{(l)} = \sigma\left(W_u^{(l)} h_{u_i}^{(l-1)} + b_u^{(l)}\right)$$

wherein $h_{u_i}^{(l)}$ refers to the implicit representation generated by the entity $u_i$ in the l-th hidden layer of the multilayer perceptrons at the input end, $h_{u_i}^{(l-1)}$ refers to the implicit representation generated by the entity $u_i$ in the l−1-th hidden layer of the multilayer perceptrons at the input end, and $h_{u_i}^{(0)} = x_i^{(u)}$ is the entity feature of the entity $u_i$, $W_u^{(l)}$ is the weight parameter matrix to be trained, $b_y^{(l)}$ is a bias parameter, and $\sigma(\cdot)$ is an activation function.

The conversion function for the tag node $h_j$ in the l-th hidden layer of the corresponding multilayer perceptrons at the input end is defined as:

$$h_{h_j}^{(l)} = \sigma\left(W_h^{(l)} h_{h_j}^{(l-1)} + b_h^{(l)}\right)$$

wherein $h_{h_j}^{(l)}$ refers to the implicit representation generated by the tag $h_j$ in the l-th hidden layer of the multilayer perceptrons at the input end, $h_{h_j}^{(l-1)}$ refers to the implicit representation generated by the tag $h_j$ in the l−1-th hidden layer, and $h_{h_j}^{(0)} = x_j^{(u)}$ is the tag feature of the tag $h_j$, $W_h^{(l)}$ is the weight parameter matrix to be trained, $b_h^{(l)}$ is a bias parameter, and $\sigma(\cdot)$ is an activation function.

Through the multilayer perceptrons arranged as above, in S41, by repeatedly stacking the hidden layers as described above, and using the output of a previous hidden layer as the input of a next hidden layer, the input high-dimensional feature vectors may be dimensionally reduced, and the dimensionally reduced output result serves as the input of the next-step graph neural network module.

In one embodiment, in order to describe the above graph convolutional network more specifically, the above S42 may specifically comprise:

Firstly, the dimensionally reduced entity feature and tag feature are input to a first graph convolutional network (for example, Bi-GCN in FIG. 6). The first graph convolutional network introduces topological structure information of the entity tag association bipartite graph through a conversion function, and outputs intermediate embedding representations of an entity node and a tag node.

In one embodiment, the first graph convolutional network introducing the topological structure information of the entity tag association bipartite graph through the conversion function comprises:

taking the entity node $u_i$ as an example, the entity node $u_i$ having the following conversion function in the l-th layer of the first graph convolutional network:

$$e_{u_i}^{(l)} = \sigma\left(e_{u_i}^{(l-1)} \Theta_1^{(l)} + \sum_{h_j \in \mathcal{N}(u_i)} e_{h_j}^{(l-1)} \Theta_2^{(l)}\right)$$

taking the tag node $h_j$ as an example, the tag node $h_j$ having the following conversion function in the l-th layer of the first graph convolutional network:

$$e_{h_j}^{(l)} = \sigma\left(e_{h_j}^{(l-1)} \Theta_1^{(l)} + \sum_{u_i \in \mathcal{N}(h_j)} e_{u_i}^{(l-1)} \Theta_2^{(l)}\right)$$

wherein $e_{u_i}^{(l)}$ and $e_{h_j}^{(l)}$ respectively refer to the embedding representations generated by the entity $u_i$ and the tag $h_j$ in the l-th layer of the first graph convolutional network, and $e_{u_i}^{(0)}$ and $e_{h_j}^{(0)}$ respectively refer to the dimensionally reduced entity feature and tag feature in S41, $\mathcal{N}(u_i)$ represents a tag node set associated with the entity $u_i$ in the entity tag association bipartite graph, $\mathcal{N}(h_j)$ represents an entity node set associated with the tag $h_j$ in the entity tag association bipartite graph, $\Theta_1^{(l)}$ and $\Theta_2^{(l)}$ are weight parameter matrixes to be trained in the l-th layer in the first graph convolutional network, and $\sigma$ is an activation function.

Subsequently, the intermediate embedding representation of the entity node is input into a second graph convolutional network (for example, S-GCN1 in FIG. 6). The second graph convolutional network introduces topological structure information and edge weight information of the entity similarity graph through a conversion function, and outputs an entity node embedding representation.

In one embodiment, the second graph convolutional network introducing the topological structure information and edge weight information of the entity similarity graph through the conversion function comprises:

taking the entity node $u_i$ as an example, the entity node $u_i$ having the following conversion function in the l-th layer graph convolutional network of the second graph convolutional network:

$$e_{u_i}^{(l)} = \sigma\left(\sum_{i'=1}^{n} (\tilde{S}_u)_{i,i'} e_{u_{i'}}^{(l-1)} \Theta_u^{(l)}\right)$$

wherein $e_{u_i}^{(l)}$ refers to the embedding representation generated by the entity $u_i$ in the l-th layer, $e_{u_{i'}}^{(l-1)}$ refers to the embedding representation generated by the entity $u_{i'}$ in the l−1-th layer, $$\tilde{S}_u = D_u'^{-\frac{1}{2}} S_u' D_u'^{-\frac{1}{2}}, \quad S_u' = S_u + I, \quad (D_u')_{i,i'} = \sum_{i'} (S_u')_{i,i'}, \quad S_u$$

is the entity similarity graph, $\Theta_u^{(l)}$ is the weight parameter matrix to be trained in the l-th layer in the second graph convolutional network, and $\sigma(\cdot)$ is an activation function.

Correspondingly, the intermediate embedding representation of the tag node is input into a third graph convolutional network (for example, S-GCN2 in FIG. 6). The third graph convolutional network introduces topological structure information and edge weight information of the tag similarity graph through a conversion function, and outputs a tag node embedding representation.

In one embodiment, the third graph convolutional network introducing the topological structure information and edge weight information of the tag similarity graph through the conversion function comprises:

taking the tag node $h_j$ as an example, the tag node $h_j$ having the following conversion function in the l-th layer graph convolutional network of the third graph convolutional network:

$$e_{h_j}^{(l)} = \sigma\left(\sum_{j'=1}^{n} (\tilde{S}_h)_{j,j'}\, e_{h_{j'}}^{(l-1)}\, \Theta_h^{(l)}\right)$$

wherein $e_{h_j}^{(l)}$ refers to the embedding representation generated by the tag $h_j$ in the l-th layer, $e_{j_j}^{(l-1)}$ refers to the embedding representation generated by the tag $h_j$ in the l–1-th layer, $$\tilde{S}_h = D_h'^{-\frac{1}{2}} S_h'^{D_h'^{-\frac{1}{2}}},\ S_h' = S_h + I,\ (D_h')_{j,j'} = \sum_{j'} (S_h')_{j,j'},\ S_h$$

is the tag similarity graph, $\theta_h^{(l)}$ is a weight parameter matrix to be trained in the l-th layer in the third graph convolutional network, and $\sigma(\bullet)$ is an activation function.

The aforementioned first graph convolutional network, second graph convolutional network and third graph convolutional network, for example, may be stacked in multiple layers (the total number of layers is denoted as $L_{GCN}$), with the output of a previous layer serving as the input of a next layer, thereby fully capturing the low-order and high-order topological structures in the graphs.

In one embodiment, the activation function $\sigma$ adopts a Leaky Rectified Linear Unit LeakyReLU, which is defined as:

$$\text{Leaky Re}LU(x) = \begin{cases} x, & x \geq 0 \\ \alpha x, & x < 0 \end{cases}$$

wherein $\alpha \in (0, 1)$ is set as a constant, representing the slope of the third quadrant ray in the activation function image.

In one embodiment, in order to perform dimensionality reduction and refinement of the node embedding representations generated by the above graph convolution computation, and unify them to the same dimension, S43 specifically comprises:

receiving a high-dimensional entity node embedding representation $e_{u_i}^{(L_{GCN})}$ and a high-dimensional tag node embedding representation $e_{h_j}^{(L_{GCN})}$, performing dimensionality reduction by iterative processing through multiple hidden layers of multilayer perceptrons at the output end, and outputting the dimensionally reduced entity feature $o_{u_i}^{(L_{MLP})}$ and tag feature $o_{h_j}^{(L_{MLP})}$.

The following is an introduction of the multilayer perceptrons at the output end corresponding to the entity node $u_i$ and the tag node $h_j$, respectively.

The conversion function for the entity node $u_i$ in the l-th hidden layer of the corresponding multilayer perceptrons at the output end is defined as:

$$o_{u_i}^{(l)} = \sigma\left(W_u^{(l)} o_{u_i}^{(l-1)} + b_u^{(l)}\right)$$

wherein $o_{u_i}^{(l)}$ refers to the implicit representation generated by the entity $u_i$ in the l-th hidden layer of the multilayer perceptrons at the output end, $o_{u_i}^{(l-1)}$ refers to the implicit representation generated by the entity $u_i$ in the l–1-th hidden layer of the multilayer perceptrons, and $o_{u_i}^{(0)} = e_{u_i}^{(L_{GCN})}$ is the entity node embedding representation of the entity $u_i$, $W_u^{(l)}$ is the weight parameter matrix to be trained, $b_u^{(l)}$ is a bias parameter, and $\sigma(\bullet)$ is an activation function.

The conversion function for the tag node $h_j$ in the l-th hidden layer of the corresponding multilayer perceptrons at the output end is defined as:

$$o_{h_j}^{(l)} = \sigma\left(W_h^{(l)} o_{h_j}^{(l-1)} + b_k^{(l)}\right)$$

wherein $o_{h_j}^{(l)}$ refers to the implicit representation generated by the tag $h_j$ in the l-th hidden layer of the corresponding multilayer perceptrons at the output end, $o_{h_j}^{(l-1)}$ refers to the implicit representation generated by the tag $h_j$ in the l–1-th hidden layer, and $o_{h_j}^{(0)} = e_{h_j}^{(L_{GCN})}$ is the tag node embedding representation of the tag $h_j$, $W_h^{(l)}$ is the weight parameter matrix to be trained, $b_h^{(l)}$ is a bias parameter, and $\sigma(\bullet)$ is an activation function.

Through the multilayer perceptrons arranged as above, in S43, by repeatedly stacking the hidden layers as described above for $L_{MLP}$ times, and using the output of a previous hidden layer as the input of a next hidden layer, the input node embedding representation generated by the graph neural network module may be dimensionally reduced and refined. Finally, the entity node $u_i$ obtains an output $o_{u_i}^{(L_{MLP})}$ through the entity-side multilayer perceptrons, and the tag node $h_j$ obtains an output $o_{h_j}^{(L_{MLP})}$ through the tag-side multilayer perceptrons, and the dimensions of the output vectors of two multilayer perceptrons should be consistent.

In one embodiment, in order to improve the model effect, the activation function adopts a Rectified Linear Unit ReLU, which is defined as:

$$ReLU(x) = \begin{cases} x, & x \geq 0 \\ 0, & x < 0 \end{cases}$$

In one embodiment, performing the dot product operation on the dimensionally reduced entity node embedding representation and tag node embedding representation, to obtain the prediction result comprises: acquiring the entity node embedding representation $o_{u_i}^{(L_{MLP})}$ of the entity $u_i$ and the tag node embedding representation $o_{h_j}^{(L_{MLP})}$ of the tag $h_j$ generated by the multilayer perceptrons; and determining the likelihood score $y_{i,j} = o_{u_i}^{(L_{MLP})^T} o_{h_j}^{(L_{MLP})}$ of the association between the entity $u_i$ and the tag $h_j$, to predict the similarity between the entity $u_i$ and the tag $h_j$.

Figure 7:
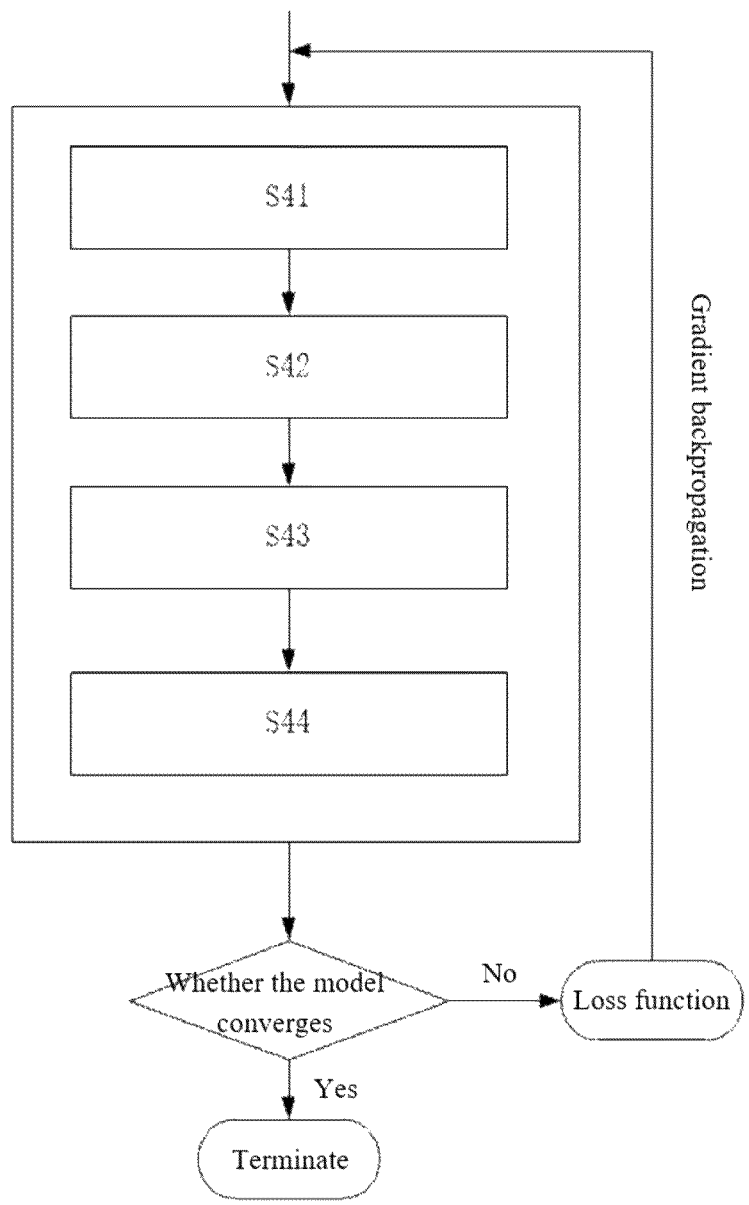
FIG. 7 is a schematic flow diagram of an entity tag association prediction method according to yet another embodiment of the present disclosure.

Referring to FIG. 7, after oupputting $y_{i,j}$ between the entity $u_i$ and the tag $h_j$, it is necessary to determine whether the trained model converges. Under the condition of convergence, the training is terminated, and the association relationship between each entity $u_i$ and each tag $h_j$ is obtained as the prediction result. Under the condition of no convergence, the objective function value is continuously reduced through a gradient descent algorithm, and the model parameters are optimized and updated, until the objective function value reaches convergence and the training is terminated.

In one embodiment, in order to mitigate high sparsity of positive samples and extreme tag imbalance in the entity-tag association matrix, and to enhance the influence of positive samples, the target value of the positive samples in the entity tag association matrix $\mathcal{R}$ may be increased to a constant greater than 1, to determine an enhanced association matrix $\tilde{Y}$; and the enhanced association matrix $\tilde{Y}$ as a fitting target is used for iteratively training of the prediction model, until the model converges.

Specifically, the target matrix $\tilde{Y}$ may be defined as the enhanced association matrix:

$$\tilde{Y}_{i,j} = \begin{cases} \varepsilon, & \text{when } \mathcal{R}_{ij} = 1 \\ 0, & \text{others} \end{cases}$$

wherein $\varepsilon > 1$ is a specified hyperparameter, reflecting the magnitude of the influence of positive samples in the target matrix, and useful for expanding the gap and distinguishability between positive samples and unobserved samples. Then, under the condition that there is already an association between entity $u_i$ and tag $h_j$, the corresponding target value $\tilde{Y}_{i,j}$ in the target matrix will be increased to a constant $\varepsilon$ greater than 1, otherwise it remains at 0.

In one embodiment, in order to enable the prediction model to learn the parameters to be learnt, the method further comprises: training the prediction model with a minimum square error (MSE) loss function $\ell$:

$$\ell = \|\Omega \circ (Y - \tilde{Y})\|_F^2 + \lambda \|\Theta\|_2^2$$

wherein $Y = (y_{i,j})_{n \times m}$ is a prediction result matrix; $\tilde{Y}$ is the enhanced association matrix; $\Omega$ is a mask matrix for observed elements; under the condition that there is already a positive association between entity $u_i$ and tag $h_j$, i.e. $\mathcal{R}_{ij}=1$, then $\Omega_{i,j}=1$; otherwise, both $\mathcal{R}_{i,j}$ and $\Omega_{i,j}$ are 0; $\circ$ denotes a Hadamard product (or an element-wise product), $\|\cdot\|_F$ is a Frobenius norm, the first item $\|\Omega \circ (Y-\tilde{Y})\|_F^2$ requires that the gap between the predicted value and the observed value should be minimized; $\Theta$ refers to all the parameters to be trained in the model; $\lambda$ is an attenuation factor, which is set as a hyperparameter for controlling the balance between a regularization item and a fitting target; $\|\cdot\|_2$ is a L2 norm; the second item $\lambda \|\Theta\|_2^2$ is a regularization item to avoid the over-fitting phenomenon.

In one embodiment, in order to improve the model training effect, the method further comprises: optimizing an objective function with a RMSProp optimizer, which requires setting hyperparameters comprising an initial learning rate $\alpha$ and an attenuation rate $\rho$; and the optimizer continuously reducing the objective function value through a gradient descent algorithm, and optimizing and updating the model parameters, until the objective function value reaches convergence and the training is terminated.

In summary, the entity-tag association prediction computing method proposed in the present disclosure focuses on completing the incomplete tag annotations for partially annotated entities. Modeling the input entity set into an inter-entity relationship network better aligns with the characteristics of samples in the real world being in complex correlations rather than being independent from each other. Optionally, the tag set involved in the present disclosure has a strict and definite hierarchical structure, which takes into account the hierarchical or semantic relationship between tags, thereby achieving a more refined division and enabling a more precise characterization of the samples. Through the input inter-entity relationship network, it can be easier to explore hidden similar features between the samples, and use this similarity to enhance the accuracy of multi-tag classification.

With respect to two objects, i.e. entities and tags, the algorithm of the present disclosure constructs three networks within two categories, respectively: relationship networks between the homogeneous nodes (i.e. an entity relationship network and a hierarchical tag relationship network) and relationship network between the heterogeneous nodes (i.e. an entity-tag association network). With respect to different types of input networks, the algorithm designs two types of graph neural network modules, respectively: a Bi-GCN module running on the bipartite graph and S-GCN modules running on the similarity graphs. Among them, the Bi-GCN module performs message propagation on the unweighted associated edges between entities and tags to realize full communication and fusion of the information contained in the two objects; the S-GCN modules perform message propagation on the weighted edges of the similarity graph, and aggregate the information contained in the adjacent nodes according to the degree of similarity. By stacking multilayer graph neural network layers for repetitive iterations, it is possible to repeatedly capture the low-order and high-order topological structures in the network, and explore the complex nonlinear relationships among objects.

In addition, during the training process, the algorithm improves the influence of positive samples in the original target association matrix, and constructs the enhanced association matrix as the final fitting target. This method effectively mitigates the severe imbalance between positive and negative samples in the data set, so that the model can fully pay attention to positive sample signals, thereby improving the final prediction accuracy.

In the description of present disclosure, the reference terms such as "some possible implementations", "some embodiments", "examples", "specific examples" or "some examples" are intended to denote that specific features, structures, materials or characteristics described in conjunction with the embodiments or examples are included in at least one embodiment or example of the present disclosure. In the present disclosure, the illustrative descriptions of the above terms do not necessarily pertain to the same embodiment or example. Moreover, the specific features, structures, materials or characteristics described may be combined as appropriate in any one or more embodiments or examples. Furthermore, a person skilled in the art may combine different embodiments or examples described in the present disclosure as well as the features of different embodiments or examples, in the absence of contradiction.

In addition, the terms "first" and "second" are for descriptive purpose only, and not to be construed as indicating or suggesting relative importance or implicitly specifying the number of the technical features indicated. Therefore, the features defined with "first", "second" may expressly or impliedly include at least one of these features. In the description of the present disclosure, "multiple" means at least two, such as two, three, etc., unless otherwise specified.

Any process or method described in the flow diagram or otherwise described herein may be construed as representing a module, segment, or portion of codes which comprise one or more executable instructions for implementing specific logical functions or steps of the process. Moreover, it should be appreciated by a person skilled in the field to which the embodiments of the present disclosure belong that, the scope of optional implementations of the present disclosure includes further implementations, wherein functions may be performed in a substantially simultaneous manner or in reverse order according to the functions involved, regardless of the order shown or discussed.

Regarding the method flow diagram according to the embodiments of the present disclosure, some operations are described as different steps performed in a certain order. Such a flow diagram is illustrative rather than restrictive. Some steps described herein may be grouped together and performed in a single operation, some steps may be divided into multiple sub-steps, and some steps may be performed in a different order than illustrated herein. The steps illustrated in the flow diagram may be implemented in any manner by any circuit structure and/or tangible mechanism (for example, software, hardware running on a computer device (for example, a processor or chip-implemented logic function) etc., and/or any combination thereof).

Figure 8:
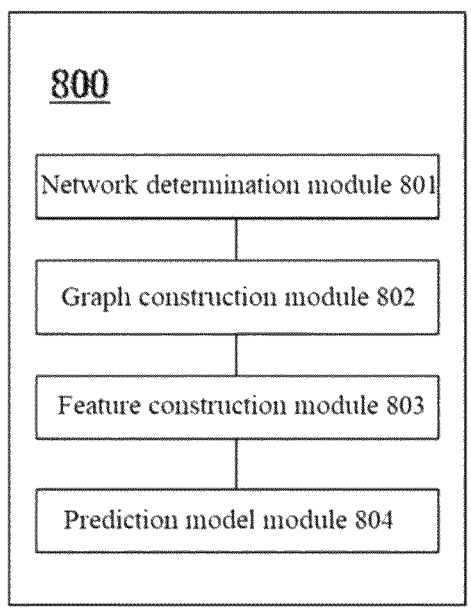
FIG. 8 is a schematic structural diagram of an entity tag association prediction device according to one embodiment of the present disclosure.

Based on the same technical conception, the embodiments of the present disclosure also provide an entity tag association prediction device, for executing the entity tag association prediction method provided in any one of the aforementioned embodiments. FIG. 8 is a schematic structural diagram of an entity tag association prediction device according to one embodiment of the present disclosure, comprising:

a network determination module 801, for determining an entity relationship network, a tag relationship network and an entity tag association network, the entity tag association network comprising an unknown entity tag association relationship;

a graph construction module 802, for constructing an entity similarity graph according to the entity relationship network, constructing a tag similarity graph according to the tag relationship network and the entity tag association network, and constructing an entity tag association bipartite graph according to the entity tag association network;

a feature construction module 803, for extracting an entity feature, and constructing a tag feature according to the tag similarity graph;

a prediction model module 804, for integrating the entity similarity graph, the tag similarity graph, and the entity tag association bipartite graph into a graph convolutional network to construct a prediction model; and inputting the entity feature and the tag feature into the prediction model for training until the model converges, and outputting a prediction result of the prediction model, the prediction result comprising the association relationship between each entity and each tag.

It should be noted that the device in the embodiments of the present disclosure can implement various procedure in the embodiments of the foregoing method, and achieve the same effect and function, which will not be repeated here.

Figure 9:
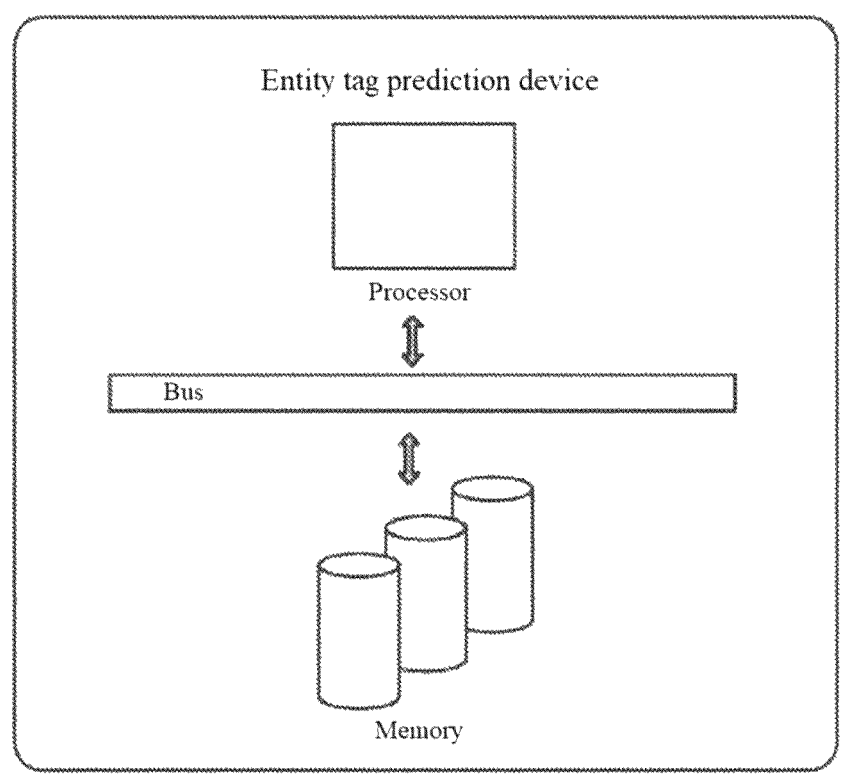
FIG. 9 is a schematic structural diagram of an entity tag association prediction device according to one embodiment of the present disclosure.

FIG. 9 is a schematic structural diagram of an entity tag association prediction device according to one embodiment of the present disclosure, for executing the method shown in FIG. 1. The device comprises: at least one processor; and a memory communicatively connected to the at least one processor; wherein the memory stores instructions executable by the at least one processor, the instructions being executed by the at least one processor to enable the at least one processor to perform: the method described in the above embodiments.

According to some embodiments of the present disclosure, there is provided a nonvolatile computer storage medium for an entity tag association prediction method, with computer executable instructions stored thereon. The computer executable instructions, when executed by a processor, are configured to perform: the method described in the above embodiments.

The embodiments of the present disclosure are described in a progressive manner, and the same and similar parts between the embodiments may be cross-referenced. What each embodiment emphasizes and focuses on makes it different from other embodiments. In particular, since the embodiments regarding the apparatus, device and computer readable storage medium are substantially similar to the method embodiments, they are simplified in description, and may refer to relevant description in the method embodiments.

The apparatus, device and computer readable storage medium provided in the embodiments of the present disclosure have one-to-one correspondence with the method. Therefore, the apparatus, device and computer readable storage medium also have the beneficial technical effects similar to those of the corresponding method. The beneficial effects of the apparatus, device and computer readable storage medium will not be repeated here, as those of the method have been described in detail above.

It should be appreciated by a person skilled in the art that the embodiments of the present disclosure may be provided as a method, a system or a computer program product. As such, the present disclosure may take the form of entirely hardware embodiments, entirely software embodiments, or embodiments combining software and hardware aspects. In addition, the present disclosure may take the form of a computer program product executed on one or more computer-usable storage medium (including, but not limited to, a magnetic disc memory, a CD-ROM and an optical memory) comprising computer-usable program codes.

The present disclosure is described with reference to flowcharts and/or block diagrams of a method, an apparatus (system) and a computer program product according to embodiments of the present disclosure. It is to be understood that each procedure and/or block in the flowcharts and/or block diagrams, and a combination of procedures and/or blocks in the flowcharts and/or block diagrams can be implemented by computer program instructions. These computer program instructions may be provided to a processor of a general purpose computer, special purpose computer, embedded processor, or other programmable data processing device to produce a machine, such that the instructions executed via the processor of the computer or other programmable data processing device produce an apparatus for performing the functions specified in one or more procedures in the flowcharts and/or one or more blocks in the block diagrams.

These computer program instructions may also be stored in a computer readable storage medium capable of directing a computer or other programmable data processing device to operate in a particular manner, such that the instructions stored in the computer readable storage medium produce an article of manufacture comprising an instruction apparatus, the instruction apparatus performing the functions specified in one or more procedures in the flowcharts and/or one or more blocks in the block diagrams.

These computer program instructions may also be loaded onto a computer or other programmable data processing device, to cause a series of operational steps to be performed on the computer or other programmable device to realize computer-implemented processing, such that the instructions executed on the computer or other programmable device provide the steps for implementing the functions specified in one or more processes in the flowcharts and/or one or more blocks in the block diagrams.

In a typical configuration, a computing device comprises one or more processors (CPU), input/output interfaces, network interfaces, and a memory.

The memory may include non-permanent memory, random access memory (RAM) and/or nonvolatile memory and other forms in computer readable medium, such as read-only memory (ROM) or flash memory (flash RAM). The memory is an example of a computer readable medium.

Computer readable medium, including permanent and non-permanent, removable and non-removable medium, may be implemented by any method or technology for storage of information. Information may be computer readable instructions, data structures, program modules or other data. Examples of the computer storage medium include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic compact cassette, magnetic tape/disc storage or other magnetic storage or any other non-transmitting medium, capable of storing information accessible by a computing device. Furthermore, while the operations of a method according to the present disclosure are described in a particular order in the drawings, this does not require or suggest that these operations need to be performed in the particular order, or all operations as illustrated need to be performed to achieve desirable results. Additionally or alternatively, some steps may be omitted, multiple steps may be combined into one step for execution, and/or one step may be divided into multiple steps for execution.

While the spirit and principles of the present disclosure have been described with reference to several specific embodiments, it is to be understood that the present disclosure is not limited to the specific embodiments disclosed herein. The division of various aspects also does not mean that the features in these aspects cannot be combined to deliver beneficial effects. Such division is just for the convenience of expression. The present disclosure is intended to cover various modifications and equivalent arrangements within the spirit and scope of the appended claims.

The invention claimed is:

1. An entity tag association prediction method, comprising:
   determining an entity relationship network, a tag relationship network and an entity tag association network, the entity tag association network comprising an unknown entity tag association relationship, wherein determining the entity relationship network, the tag relationship network and the entity tag association network comprises:
      determining the entity relationship network $G_u(\mathcal{U}, \varepsilon_u)$ with multiple entities in an entity set $\mathcal{U} = \{u_1, u_2, \ldots, u_n\}$ as nodes, wherein n is a total number of entities, and $\varepsilon_u \subseteq \mathcal{U} \times \mathcal{U}$ indicates a relationship between various entities in the entity set;
      determining the tag relationship network $G_h(\mathcal{H}, \varepsilon_h)$ with multiple tags in a tag set $\mathcal{H} = \{h_1, h_2, \ldots, h_m\}$ as nodes, wherein m is a total number of tags, and $\varepsilon_h \subseteq \mathcal{H} \times \mathcal{H}$ indicates a relationship between various tags in the tag set $\mathcal{H} = \{h_1, h_2, \ldots, h_m\}$; and
      determining the entity tag association network $\mathcal{R} \subseteq \{0, 1\}^{n \times m}$ according to existing annotation information, wherein association $\mathcal{R}_{ij}$ between each entity $u_i$ (i=1, 2, \ldots, n) and each tag $h_j$ (j=1, 2, \ldots, m) is 1 or 0;
   constructing an entity similarity graph according to the entity relationship network, constructing a tag similarity graph according to the tag relationship network and the entity tag association network, and constructing an entity tag association bipartite graph according to the entity tag association network;
   extracting an entity feature, and constructing a tag feature according to the tag similarity graph;
   integrating the entity similarity graph, the tag similarity graph, and the entity tag association bipartite graph into a graph convolutional network to construct a prediction model; and
   inputting the entity feature and the tag feature into the prediction model for training until the prediction model converges, and outputting a prediction result of the prediction model, the prediction result comprising an association relationship between each entity and each tag.

2. The entity tag association prediction method according to claim 1, wherein the tag set $\mathcal{H} = \{h_1, h_2, \ldots, h_m\}$ is a hierarchical tag set, and the tag relationship network forms a tree structure, with upper and lower tag nodes of the tree structure having a parent-child inheritance relationship.

3. The entity tag association prediction method according to claim 2, wherein the entity tag association prediction method further comprises:
   updating the existing annotation information according to a hierarchical relationship between the tags;
   wherein under a condition that a specified entity is annotated with a specified tag, the specified entity will be supplementarily annotated with all ancestral tags of the specified tag according to the tag relationship network.

4. The entity tag association prediction method according to claim 2, wherein constructing the tag similarity graph according to the tag relationship network and the entity tag association network further comprises:
   computing tag information quantity IC(h) of each tag based on the entity tag association network $\mathcal{R}$, wherein the tag information quantity indicates entity annotation ratio of each tag to measure degree of concreteness of each tag; and
   computing a similarity between tags using the tag information quantity of each tag and the tag relationship network, to obtain a tag similarity graph $S_h$;
   wherein the tag similarity graph $S_h \in [0,1]^{m \times m}$ forms an r-order square matrix.

5. The entity tag association prediction method according to claim 1, wherein constructing the entity similarity graph according to the entity relationship network further comprises:
   determining an entity similarity graph $S_u$ according to an adjacency matrix $A_u$ of the entity relationship network $G_u$;
   wherein the adjacency matrix $A_u \in [0,1]^{n \times m}$ forms an n-order square matrix, the entity relationship network $G_u$ is an undirected weighted network, and edge weight $(A_u)_{i,i'} = (A_u)_{i,i'}$ between entity $u_i$ and entity $u_{i'}$ indicates degree of closeness of relationship between two entities.

6. The entity tag association prediction method according to claim 1, wherein constructing the entity tag association bipartite graph according to the entity tag association network comprises:
constructing an entity tag association bipartite graph A according to an entity tag association matrix R; wherein $$A = \begin{bmatrix} 0 & R \\ R^T & 0 \end{bmatrix},$$

and 0 is an all-zero matrix.

7. The entity tag association prediction method according to claim 1, wherein extracting the entity feature and constructing the tag feature according to the tag similarity graph comprises:
determining a multi-dimensional entity feature $x_i^{(u)}$ of each entity $u_i$ in the entity set through feature mining;
performing symmetric normalization according to the tag similarity graph $S_h$ to obtain a normalized matrix $\overline{S_h}$;
computing a positive pointwise mutual information matrix $X^{(h)}$ based on the normalized matrix $\overline{S_h}$; and
constructing the tag feature according to the positive pointwise mutual information matrix $X^{(h)}$, wherein $x_j^{(h)}$ of a j-th row of the positive pointwise mutual information matrix $X^{(h)}$ serves as the tag feature $x_j^{(h)}$ of a j-th tag $h_j$.

8. The entity tag association prediction method according to claim 1, wherein inputting the entity feature and the tag feature into the prediction model for training comprises:
performing dimensionality reduction on the input entity feature and the tag feature respectively with multilayer perceptrons at an input end;
inputting the dimensionally reduced entity feature and tag feature into the prediction model, to obtain an entity node embedding representation corresponding to each entity and a tag node embedding representation corresponding to each tag;
performing dimensionality reduction on the entity node embedding representation and the tag node embedding representation respectively with multilayer perceptrons at an output end; and
performing a dot product operation on the dimensionally reduced entity node embedding representation and tag node embedding representation, to obtain the prediction result.

9. The entity tag association prediction method according to claim 8, wherein inputting the dimensionally reduced entity feature and tag feature into the graph convolutional network comprises:
inputting the dimensionally reduced entity feature and tag feature into a first graph convolutional network, wherein the first graph convolutional network introduces topological structure information of the entity tag association bipartite graph through a conversion function, and outputs intermediate embedding representations of the entity node and the tag node;
inputting the intermediate embedding representation of the entity node into a second graph convolutional network, wherein the second graph convolutional network introduces topological structure information and edge weight information of the entity similarity graph through a conversion function, and outputs the entity node embedding representation; and
inputting the intermediate embedding representation of the tag node into a third graph convolutional network, wherein the third graph convolutional network introduces topological structure information and edge weight information of the tag similarity graph through a conversion function, and outputs the tag node embedding representation.

10. The entity tag association prediction method according to claim 9, wherein the first graph convolutional network introducing the topological structure information of the entity tag association bipartite graph through the conversion function comprises:
the entity node $u_i$ having the following conversion function in an l-th layer of the first graph convolutional network:

$$e_{u_i}^{(l)} = \sigma\left(e_{u_i}^{(l-1)}\Theta_1^{(l)} + \sum_{h_j \in \mathcal{N}(u_i)} e_{h_j}^{(l-1)}\Theta_2^{(l)}\right)$$

the tag node $h_j$ having the following conversion function in the l-th layer of the first graph convolutional network:

$$e_{h_j}^{(l)} = \sigma\left(e_{h_j}^{(l-1)}\Theta_1^{(l)} + \sum_{u_i \in \mathcal{N}(h_j)} e_{u_i}^{(l-1)}\Theta_2^{(l)}\right)$$

wherein $e_{u_i}^{(l)}$ and $e_{h_j}^{(l)}$ respectively refer to embedding representations generated by the entity $u_i$ and the tag $h_j$ in the l-th layer of the first graph convolutional network, and $e_{u_i}^{(0)}$ and $e_{h_j}^{(0)}$ respectively refer to the dimensionally reduced entity feature and tag feature, $\mathcal{N}(u_i)$ represents a tag node set associated with the entity $u_i$ in the entity tag association bipartite graph, $\mathcal{N}(h_j)$ represents an entity node set associated with the tag $h_j$ in the entity tag association bipartite graph, $\Theta_1^{(l)}$ and $\Theta_2^{(l)}$ are weight parameter matrixes to be trained in the l-th layer in the first graph convolutional network, and u is an activation function.

11. The entity tag association prediction method according to claim 9, wherein the second graph convolutional network introducing the topological structure information and the edge weight information of the entity similarity graph through the conversion function comprises:
the entity node $u_i$ having a conversion function as follows in an l-th layer graph convolutional network of the second graph convolutional network:

$$e_{u_i}^{(l)} = \sigma\left(\sum_{i'=1}^{n} (\tilde{S}_u)_{i,i'} e_{u_{i'}}^{(l-1)} \Theta_u^{(l)}\right)$$

wherein $e_{u_i}^{(l)}$ refers to an embedding representation generated by the entity $u_i$ in the l-th layer, $e_{u_i}^{(l-1)}$ refers to an embedding representation generated by the entity $u_i$, in the l–1-th layer, $$\tilde{S}_u = D_u'^{-\frac{1}{2}} S_u' D_u'^{-\frac{1}{2}}, \ S_u' = S_u + I, \ (D_u')_{i,i'} = \sum_{i'} (S_u')_{i,i'}, \ S_u$$

$S_u$ is the entity similarity graph, $\Theta_u^{(l)}$ is a weight parameter matrix to be trained in a l-th layer in the second graph convolutional network, and $\sigma(\cdot)$ is an activation function.

12. The entity tag association prediction method according to claim 9, wherein the third graph convolutional network introducing the topological structure information and the edge weight information of the tag similarity graph through the conversion function comprises:
   the tag node $h_j$ having a conversion function as follows in an l-th layer graph convolutional network of the third graph convolutional network:

$$e_{h_j}^{(l)} = \sigma\left(\sum_{j'=1}^{n}(\tilde{S}_h)_{j,j'}e_{h_{j'}}^{(l-1)}\Theta_h^{(l)}\right)$$

wherein $e_{h_j}^{(l)}$ refers to an embedding representation generated by the tag $h_j$ in the l-th layer, $e_{h_j}^{(l-1)}$ refers to an embedding representation generated by the tag $h_j$ in an l–1-th layer, $$\tilde{S}_h = D_h'^{-\frac{1}{2}} S_h' D_h'^{-\frac{1}{2}}, S_h' = S_h + I, (D_h')_{j,j'} = \sum_{j'}(S_h')_{j,j'},$$

is the tag similarity graph, $\Theta_h^{(l)}$ is a weight parameter matrix to be trained in the l-th layer in the third graph convolutional network, and $\sigma(\cdot)$ is an activation function.

13. The entity tag association prediction method according to claim 9, wherein performing the dot product operation on the dimensionally reduced entity node embedding representation and tag node embedding representation, to obtain the prediction result comprises:
   acquiring the entity node embedding representation $o_{u_i}^{(L_{MLP})}$ of the entity $u_i$ and the tag node embedding representation $o_{h_j}^{(L_{MLP})}$ of the tag $h_j$ generated by the multilayer perceptrons at the output end; and
   computing a likelihood score $y_{i,j} = o_{u_i}^{(L_{MLP})} o_{h_j}^{(L_{MLP})}$ of the association between the entity $u_i$ and the tag $h_j$, to predict similarity between the entity $u_i$ and the tag $h_j$.

14. The entity tag association prediction method according to claim 8, wherein performing dimensionality reduction on the input entity feature and the tag feature respectively with multilayer perceptrons at the input end further comprises:
   defining a conversion function for the entity node $u_i$ in an l-th hidden layer of the corresponding multilayer perceptrons at the input end as:

$$h_{u_i}^{(l)} = \sigma\left(W_u^{(l)} h_{u_i}^{(l-1)} + b_u^{(l)}\right)$$

wherein $h_{u_i}^{(l)}$ refers to an implicit representation generated by the entity $u_i$ in the l-th hidden layer of the multilayer perceptrons at the input end, $h_{u_i}^{(l-1)}$ refers to an implicit representation generated by the entity $u_i$ in the l–1-th hidden layer of the multilayer perceptrons, and $h_{u_i}^{(0)} = x_i^{(u)}$ is the entity feature of the entity $u_i$, $W_u^{(l)}$ is a weight parameter matrix to be trained, $b_u^{(l)}$ is a bias parameter, and $\sigma(\cdot)$ is an activation function; and
   defining a conversion function for the tag node $h_j$ in the l-th hidden layer of the corresponding multilayer perceptrons at the input end as:

$$h_{h_j}^{(l)} = \sigma\left(W_h^{(l)} h_{h_j}^{(l-1)} + b_h^{(l)}\right)$$

wherein $h_{h_j}^{(l)}$ refers to an implicit representation generated by the tag $h_j$ in the l-th hidden layer, $h_{h_j}^{(l-1)}$ refers to an implicit representation generated by the tag $h_y$ in the l–1-th hidden layer, and $h_{hj}^{(0)} = x_j^{(u)}$ is the entity feature of the tag $h_j$, $W_h^{(l)}$ is a weight parameter matrix to be trained, $b_h^{(l)}$ is a bias parameter, and $\sigma(\cdot)$ is an activation function.

15. The entity tag association prediction method according to claim 8, wherein performing dimensionality reduction on the entity node embedding representation and the tag node embedding representation respectively with multilayer perceptrons at the output end further comprises:
   defining a conversion function for the entity node $u_i$ in an l-th hidden layer of the corresponding multilayer perceptrons at the output end as:

$$o_{u_i}^{(l)} = \sigma\left(W_u^{(l)} o_{u_i}^{(l-1)} + b_u^{(l)}\right)$$

wherein $o_{u_i}^{(l)}$ refers to an implicit representation generated by the entity $u_i$ in the l-th hidden layer of the multilayer perceptrons at the output end, $o_{u_i}^{(l-1)}$ refers to the implicit representation generated by the entity $u_i$ in the l–1-th hidden layer of the multilayer perceptrons at the output end, and $o_{u_i}^{(0)} = e_{u_i}^{(L_{GCN})}$ is the entity node embedding representation of the entity $u_i$, $W_u^{(l)}$ is a weight parameter matrix to be trained, $b_u^{(l)}$ is a bias parameter, and $\sigma(\cdot)$ is an activation function; and
   defining a conversion function for a tag node $h_j$ in the l-th hidden layer of the corresponding multilayer perceptrons at the output end as:

$$o_{h_j}^{(l)} = \sigma\left(W_h^{(l)} o_{h_j}^{(l-1)} + b_h^{(l)}\right)$$

wherein $o_{h_j}^{(l)}$ refers to an implicit representation generated by the tag $h_j$ in the l-th hidden layer of the corresponding multilayer perceptrons at the output end, $o_{h_j}^{(l-1)}$ refers to an implicit representation generated by the tag $h_j$ in the l–1-th hidden layer, and $o_{h_j}^{(0)} = e_{hj}^{(L_{GCN})}$ is a tag node embedding representation of the tag $h_j$, $W_h^{(l)}$ is a weight parameter matrix to be trained, $b_h^{(l)}$ is a bias parameter, and $\sigma(\cdot)$ is an activation function.

16. The entity tag association prediction method according to claim 1, further comprising:
   increasing a target value of a positive sample in the entity tag association network $\mathcal{R}$ to a constant greater than 1, to determine an enhanced association matrix $\tilde{Y}$; and
   using the enhanced association matrix $\tilde{Y}$ as a fitting target for iterative training of the prediction model, until the prediction model converges.

17. The entity tag association prediction method according to claim 16, further comprising:
   training the prediction model with a minimum squared error loss function l;
   wherein the minimum squared error loss function $l = \|\Omega \cdot (Y - \tilde{Y})\|_F^2 + \lambda \|\Theta\|_2^2$, wherein Y is a prediction result matrix, $\tilde{Y}$ is the enhanced association matrix, $\lambda$ is an attenuation factor; $\Omega$ is a mask matrix for observed elements; ○ denotes an element-wise product, $\Theta$ refers to all parameters to be trained in the prediction model, $\|\cdot\|_F$ is a Frobenius norm, and $\|\cdot\|_2$ is a L2 norm.

18. An entity tag association prediction device, comprising:
   at least one processor; and a memory communicatively connected to the at least one processor; wherein the memory stores instructions executable by the at least one processor, the instructions being executed by the at least one processor to enable the at least one processor to perform: the entity tag association prediction method according to claim 1.

19. A computer readable storage medium, with a program stored thereon, wherein the program, when executed by a multicore processor, causes the multicore processor to perform the entity tag association prediction method according to claim 1.

* * * * *